(12) United States Patent
Westbrook

(10) Patent No.: US 8,744,989 B1
(45) Date of Patent: Jun. 3, 2014

(54) RANKING AND VOTE SCHEDULING USING STATISTICAL CONFIDENCE INTERVALS

(71) Applicant: Google Inc., Mountain View, CA (US)

(72) Inventor: John D. Westbrook, Reston, VA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/932,518

(22) Filed: Jul. 1, 2013

Related U.S. Application Data

(63) Continuation of application No. 12/869,495, filed on Aug. 26, 2010, now Pat. No. 8,494,992.

(51) Int. Cl.
  *G06F 17/00* (2006.01)
  *G06N 5/00* (2006.01)
(52) U.S. Cl.
  USPC ............................................................ 706/45
(58) Field of Classification Search
  None
  See application file for complete search history.

(56) References Cited

U.S. PATENT DOCUMENTS

| | | | |
|---|---|---|---|
| 6,006,222 | A | 12/1999 | Culliss |
| 6,029,195 | A | 2/2000 | Herz |
| 8,494,992 | B1 | 7/2013 | Westbrook |
| 2008/0256002 | A1 | 10/2008 | Yoshida et al. |
| 2009/0024457 | A1* | 1/2009 | Foroutan ........................ 705/12 |
| 2009/0046584 | A1 | 2/2009 | Garcia et al. |
| 2009/0198566 | A1 | 8/2009 | Greenberg |
| 2010/0205590 | A1 | 8/2010 | Puchinger et al. |
| 2010/0287028 | A1 | 11/2010 | Hauser |

FOREIGN PATENT DOCUMENTS

| | | |
|---|---|---|
| WO | 2006/013571 | 2/2006 |
| WO | 2010/006439 | 1/2010 |

OTHER PUBLICATIONS

Miller "How Not to Sort by Average Rating", 2009, pp. 4 http://www.evanmiller.org/how-not-to-sort-by-average-rating.html.*
Magov et al. "Interval-based Multi-Criteria Decision Making: Strategies to Order Intervals", Fuzzy Information Processing, 2008, pp. 6.*

(Continued)

*Primary Examiner* — Li-Wu Chang
(74) *Attorney, Agent, or Firm* — Fish & Richardson P.C.

(57) ABSTRACT

Method, computer-readable media, and systems for ranking content submissions and scheduling content submissions for additional voting in a distributed online community are disclosed. A statistical confidence interval is calculated for the approval ratio of each content submission based on one or more scaling formulae. A popularity ranking of the content submissions is generated based on the lower bounds of the confidence intervals calculated for the content submissions. Top-ranked content submissions in the popularity ranking are presented to users as the most popular content submissions. A voting priority ranking of the content submissions is generated based on the upper bounds of the confidence intervals calculated for the content submissions. Top-ranked content submissions in the voting priority ranking are selected as featured content submissions for additional voting. The selection of the top-ranked content submissions for additional voting is randomized based on a selected probability distribution.

20 Claims, 7 Drawing Sheets

(56) References Cited

OTHER PUBLICATIONS

Wikipedia, "Binomial proportion confidence interval" [online], [retrieved on Feb. 24, 2011]. Retrieved from the Internet <URL: http://en.wikipedia.org/wiki/binomial_proportion_confidence_interval>, 5 pages.

Wikipedia, "Confidence interval" [online], [retrieved on Feb. 24, 2011]. Retrieved from the Internet <URL: http://en.wikipedia.org/wiki/confidence_interval>, 13 pages.

Wikipedia, "Google Moderator" [online], [retrieved on Feb. 24, 2011]. Retrieved from the Internet <URL: http://en.wikipedia.org/wiki/Google_moderator>, 2 pages.

Miller, "How not to sort by average average rating," http://www.evanmiller.org/how-not-to-sort-by-average-rating.html, 2009, 4 pages.

Jouini et al., "Upper confidence bound based decision making strategies and dynamic spectrum access," IEEE ICC 2010, 5 pages.

International Search Report and Written Opinion from International Application No. PCT/US2012/022174 mailed Apr. 17, 2012, 13 pages.

* cited by examiner

RANKING AND VOTE SCHEDULING USING STATISTICAL CONFIDENCE INTERVALS

CROSS-REFERENCE

This application is a continuation application of U.S. patent application Ser. No. 12/869,495, filed Aug. 26, 2010, the entire disclosure of which is hereby incorporated by reference in its entirety.

BACKGROUND

This specification relates generally to content management in distributed online communities.

The Internet provides access to a great number of forums in which people can exchange information, ideas, opinions, and digital resources of various formats. Examples of these online forums include blogs, digital bulletin boards, online discussion boards, social websites, online gaming sites, online market place, and so on. A user of an online forum can submit content (e.g., questions, ideas, comments, and/or media resources) to a server of the online forum, and the server then provides the submitted content to other users for viewing and/or comments.

A server of an online forum often receives a large number of content submissions from the forum users. In order to better facilitate content viewing by the forum users, the server sometimes categorizes the content submissions under different topics. In addition, the server sometimes also ranks the content submissions in each topic category based on the user feedback received for each content submission. The feedback is provided by the forum users who have viewed the content submission in the form of an approval vote or a disapproval vote, for example. Top-ranked content submissions are optionally provided to other users who have not viewed the content submissions as the most popular content submissions in the topic category.

Sometimes, the server of an online forum also provides selected content submissions to forum users as featured content submissions and invites the users to provide feedback with respect to the featured content submissions. By proactively presenting a content submission as a featured content submission to users, the server can prompt the users to provide their favorable or unfavorable opinions of the content submission, and quickly gather the feedback data needed to determine the popularity of the content submission.

SUMMARY

This specification describes technologies relating to ranking content submissions and scheduling content submission for voting by users in an online community.

In general, one aspect of the subject matter described in this specification can be embodied in a method that includes: calculating a current value of a respective approval ratio for each of a plurality of content submissions, the respective approval ratio being a proportion of approval votes among all votes currently accumulated for the content submission; calculating a statistical lower bound for the respective approval ratio of each content submission according to a first scaling method, wherein the first scaling method scales down the current value of the respective approval ratio by a decreasing amount with an increasing vote count for the content submission; and generating an approval ranking for the plurality of content submissions according to the statistical lower bound calculated for the respective approval ratio of each of the content submissions.

Other embodiments of this aspect include corresponding systems, apparatus, and computer programs, configured to perform the actions of the methods, encoded on computer storage devices.

These and other embodiments can optionally include one or more of the following features.

In some implementations, the first scaling method scales the current value of the approval ratio to a lower bound of a Wilson score interval calculated for the current value of the approval ratio.

In some implementations, the methods further include: calculating a statistical upper bound for the respective approval ratio of each content submission according to a second scaling method, wherein the second scaling method scales up the current value of the respective approval ratio by a decreasing amount with an increasing vote count for the content submission; generating a voting priority ranking for the plurality of content submissions according to the statistical upper bound calculated for the respective approval ratio of each content submission; and selecting one or more content submissions in the voting priority ranking as featured content submissions for additional voting according to respective ranks of the one or more content submissions in the voting priority ranking.

In some implementations, the second scaling method scales the current value of the approval ratio to an upper bound of a Wilson score interval calculated for the current value of the approval ratio.

In some implementations, selecting one or more content submissions for additional voting further includes: generating a random number according to a selected probability distribution, wherein each value of the random number occurs with a decreasing probability as the value of the random number increases; identifying one of the one or more content submissions in the voting priority ranking based on the random number, wherein the respective rank of the identified content submission in the voting priority ranking matches the value of the random number; and presenting the identified content submission in the voting priority ranking as a featured submission for additional voting to a user.

In some implementations, the selected probability distribution is a geometric probability distribution.

In general, one aspect of the subject matter described in this specification can be embodied in a method that includes: calculating a current value of a respective approval ratio for each of a plurality of content submissions, the respective approval ratio being a proportion of approval votes among all votes currently accumulated for the content submission; calculating a statistical confidence interval for the respective approval ratio of each content submission, wherein an upper bound and a lower bound of the statistical confidence interval each departs from the current value of the respective approval ratio by a decreasing amount with an increasing vote count for the content submission; generating an approval ranking of the plurality of content submissions according to the lower bound of the statistical confidence interval calculated for each of the content submissions; generating a voting priority ranking of the plurality of content submissions according to the upper bound of the statistical confidence interval calculated for each of the content submissions; selecting first one or more content submissions in the approval ranking as popular content submissions among the plurality of content submissions according to respective ranks of the first one or more content submissions in the approval ranking; and selecting second one or more content submissions in the voting priority ranking as featured submissions for additional voting according to respective ranks of the second one or more content submissions in the voting priority ranking.

Other embodiments of this aspect include corresponding systems, apparatus, and computer programs, configured to perform the actions of the methods, encoded on computer storage devices.

These and other embodiments can optionally include one or more of the following features.

In some implementations, selecting one or more content submissions in the voting priority ranking for additional voting further includes: randomizing the selection from the one or more content submissions in the voting priority ranking for additional voting according to a selection probability assigned to each of the one or more content submissions in the voting priority ranking.

Particular embodiments of the subject matter described in this specification can be implemented to realize one or more of the following advantages.

In an online community, content submissions and vote submissions are highly concurrent processes. Conventional popularity ranking methods based on an absolute vote count (e.g., the number of approval votes minus the number of disapproval votes) or approval ratio (e.g., a ratio between the number of approval votes and the number of all votes) are biased toward early-arriving content submissions and perform poorly when the number of votes collected for each content submission is small.

The embodiments described in this specification improve the ranking accuracy by calculating a statistical confidence interval for the approval ratio, where the statistical confidence interval takes into account the number of votes currently accumulated for each content submission. By utilizing the lower bound of the confidence interval as the ranking criterion for content popularity, a server of an online community is able to remove at least some of the bias conventionally afforded to the early-arriving content submissions, and allow late-arriving content submissions a fair opportunity to compete with the early-arriving content submissions based on the user feedback that have been received by the content submissions at the time of ranking.

In addition, by using confidence interval formulae that perform well for small sample sizes, such as the Wilson score formula, a server of the online community can quickly determine whether a content submission has the potential to become a popular content submission based on a small number of votes initially received for the content submission.

Furthermore, user feedback (e.g., votes) is a scarce resource. Conventional methods of vote scheduling either allocate voting opportunities evenly across all content submissions or are biased toward popular content submissions that have already accumulated enough votes to establish their true popularity levels. Such conventional vote scheduling methods lead to inefficient allocation of voting opportunities on unpopular content submissions and established popular content submissions.

By using the upper bound of the confidence interval as a ranking criterion for prioritizing a content submission for additional voting, opportunities for gathering votes can be diverted from unpopular content submissions and established popular content submissions, and reallocated to content submissions that are more likely to become popular with additional voting. This efficient vote allocation also helps to improve the fidelity of the exact ranking orders of the more popular content submissions.

The popularity ranking and vote scheduling based on the lower and upper bounds of a statistical confidence interval can be dynamically adjusted with each additional vote received for a content submission. Therefore, the concurrency and latency inherent in the content submission and voting processes in an online community are addressed by the technologies described in this specification.

In addition, the vote scheduling can be further randomized within the top-ranked content submissions in the vote priority ranking to avoid unintuitive effects of edge cases (e.g., single vote cases) that occur in the voting priority ranking process.

The details of one or more embodiments of the subject matter described in this specification are set forth in the accompanying drawings and the description below. Other features and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
FIG. 1 is an example user interface of a distributed online community.

FIG. 1 is an example user interface 100 provided by a server of a distributed online community. Examples of a distributed online community include, blogs, digital bulletin boards, online discussion boards, social websites, online gaming sites, online market place, and so on. A user of an online community submits content (e.g., questions, ideas, comments, descriptions of items for sale, and/or media resources) to a server of the online community, and the server then provides the submitted content to other users for viewing and/or comments. Each viewer of the content submissions optionally votes on one or more of the content submissions to express his or her approval or disapproval of the content submissions.

In some implementations, the server of the online community organizes the content submissions under different topic categories. The topical categories are established either by users or by the server of the online community. The server of the online community tallies the votes received for each content submission and ranks the content submissions under each topical category based on the overall feedback (e.g., votes) received on the content submission. The ranking is optionally based on a score computed based on the votes, for example.

In some implementations, the server of the online community recommends the top-ranked content submissions to users as popular content submissions. In some implementations, the server of the online community also presents one or more featured content submissions to the users to prompt user feedback on those content submissions. The featured content submissions are selected from among all available content submissions by the server of the online community according to various vote-scheduling criteria, for example. The vote scheduling is optionally based on the overall feedback received on the content submissions, as well. For example, priority of a content submission in vote scheduling is optionally based on a score computed based on the votes currently received for the content submission, for example.

In the example user interface 100, a user has subscribed to one or more existing topics established by another user or by the server of the online community. The subscribed topics are displayed in a display area 102 of the user interface 100, for example. In some implementations, each subscribed topic is selectable by the user such that content submissions pertaining to the selected topic are displayed in the main display area 104 within the user interface 100. In some implementations, the display area 102 also allows the user to browse and subscribe to additional topics available on the server, and/or to start a new topic by invoking various user interface elements (e.g., links) shown in the display area 102.

In the main display area 104 of the user interface 100, content submissions pertaining to a selected topic are displayed. The order by which the content submissions are displayed is optionally decided by the user through a user preference setting. For example, the user can choose to browse the content submissions under a selected topic by the order that the content submissions were received by the server. Alternatively, the user can choose to browse only the content submissions that were newly added to the selected topic, for example, within the last day, week, or other specific period.

In some implementations, the main display area 104 displays the content submissions pertaining to a selected topic in an order according to a popularity ranking of the content submissions. For example, in the display area 106, the content submissions are listed according to a popularity ranking generated by the server of the online community. Each content submission 108 (e.g., content submission 108*a-d*) is presented with a brief description that is expandable to show the full content of the content submission 108. Each content submission 108 is further accompanied with a user interface element 110 (e.g., user interface elements 110*a-d*) that illustrates the number of approval votes and the number of disapproval votes currently accumulated for the content submission 108. The user interface element 110 can be implemented in various forms, such as a pie chart, a histogram, numeric vote counts, and so on.

In some implementations, each content submission 118 is further accompanied with a voting element 112 (e.g., voting elements 112*a-d*) that can be invoked by a user to submit an approval or disapproval vote with respect to the content submission 118. The voting element 112 can be implemented in various forms, such as a check mark and a cross, a thumb-up and a thumb-down, and so on. Each time a user views a content submission and invokes the voting element 112 to enter an approval or a disapproval vote, the server of the online community receives and registers the vote for the content submission. The registered vote is then added to the vote tally for the content submission by the server. In some implementations, the server implements authentication measures to ensure that at most one vote is registered for each user for each content submission.

In addition to the display area 106, the user interface 100 also optionally includes a display area 114 showing one or more featured content submissions 116. Each featured content submission 116 includes a brief description that is expandable to show the full content of the featured content submission 116. Each content submission 116 is further accompanied with a voting element 118 that invites a user to submit an approval or disapproval vote for the featured content submission 116. In some implementations, if the user is not interested in submitting a vote for the currently presented featured content submission, the user is invited to skip to the next featured content submission.

In some implementations, the user interface 100 also includes a display area 120 that accounts the number of topics, content submissions, and votes that a user has submitted to the online community. In some implementations, the user's status within the online community improves with the number of topics, content submissions, and/or votes the user has contributed to the online community. In some implementations, when ranking the content submissions based on users' votes, the weight associated with a vote submitted by each user increases as the status of the user improves.

FIG. 1 is merely an illustrative example of a user interface for a distributed online community. Not all user interface elements presented in the user interface 100 are necessary, and the user interface elements shown in FIG. 1 are optionally implemented on separate user interfaces in various implementations.

Figure 2:
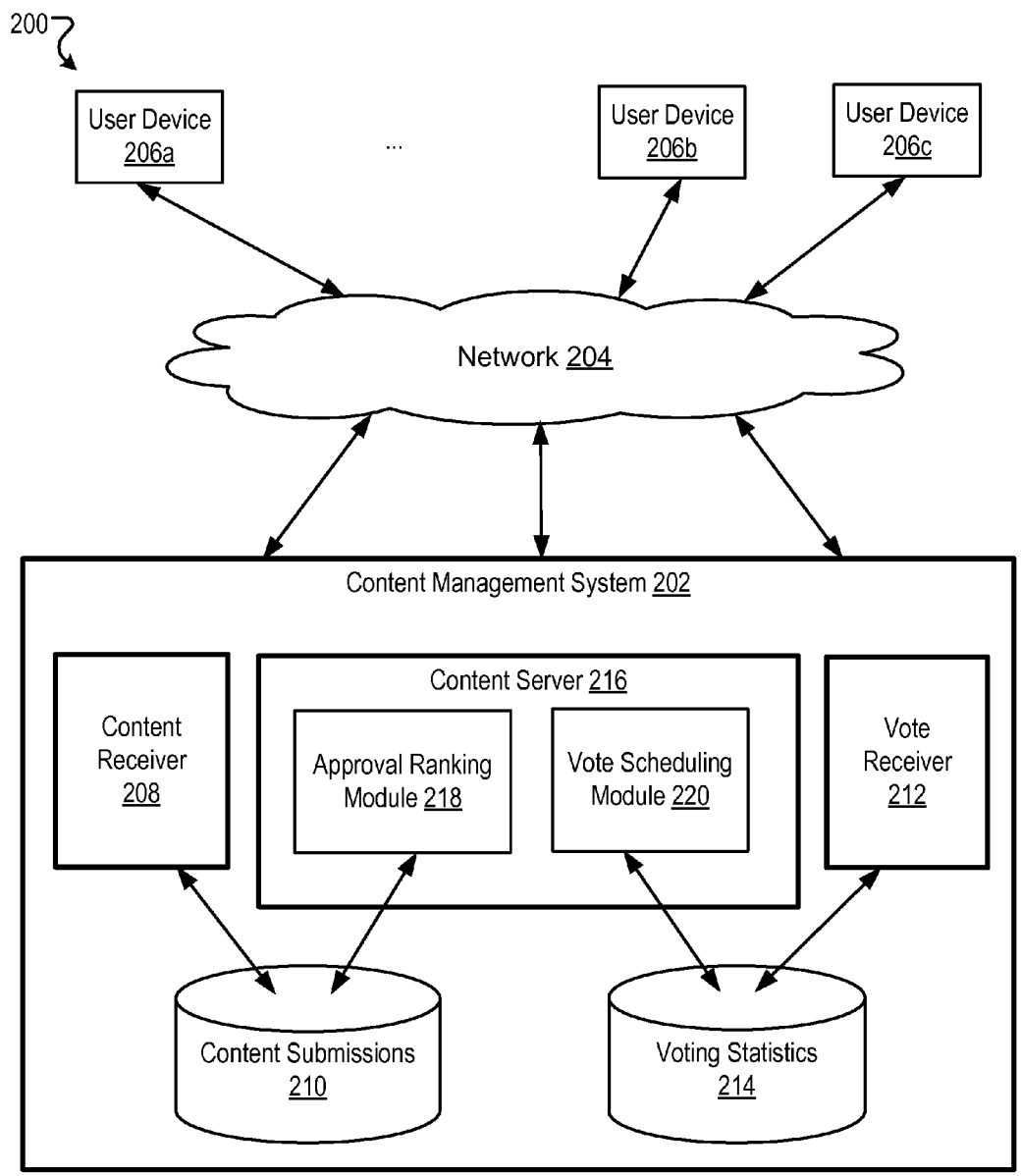
FIG. 2 is a block diagram of an example distributed online community environment.

FIG. 2 illustrates an example distributed online community environment 200. In the example online community environment 200, users (e.g., using user devices 206) communicate with a content management system 202 (e.g., a server of the online community) through a network 204. Examples of the network 204 include combinations of one or more local area networks (LAN), wide area networks (WAN), peer-to-peer networks, wireless networks, and/or other equivalent communication networks. Each user device 206 includes software applications (e.g., a web browser) that present user interfaces (e.g., example user interface 100 shown in FIG. 1) for accessing data and resources available on the content management system 202, and transmitting content submissions and vote submissions to the content management system 202.

The content management system 202 includes a content receiver 208, a content server 216, and a vote receiver 212. Other components (e.g., a user management module) of the content management system 202 are possible.

The content receiver 208 receives content submissions from the user devices 206 and stores the received content submissions in the content submissions data store 210. Each content submission is optionally associated with one or more topical categories, time of submission, a content type, a user ID associated with the submitting user, and/or other information data.

The topical categories are optionally specified by users through the user devices 106 or by the content management system 202. The content submissions are organized under associated topic categories in the content submission data store 210. The content types include, for example, question, idea, suggestion, comment, or various types of media resources (e.g., image, video, audio, webpage, etc.), and so on. Other content types are possible, and definable by the users or the content management system 202.

The content server 216 provides content submissions stored in the content submission data store 210 to the users of the online community according to the users' requests (e.g., made through the user interface 100 shown in FIG. 1). In some implementations, each user subscribes to one or more topical categories, and by default, only content submissions in the subscribed topical categories are presented to the user. Additional content submissions are presented to the users upon specific requests, such as by new subscriptions or through user browsing.

In some implementations, the content server 216 presents the content submissions with the option for the users to submit a vote expressing approval or disapproval with respect to each presented content submission. If a viewing user enters a vote with respect to a content submission, the vote receiver 212 receives the vote and associates the vote with the content submission in the voting statistics data store 214. The voting statistics data store 214 stores the votes received for each content submission.

Each vote is either an approval vote or a disapproval vote submitted by a user with respect to a content submission in the content submission data store 210. Each vote in the voting statistics data store 214 is also associated with one or more of a user ID for the user submitting the vote, a time that the vote is submitted, a content type for the content submission associated with the vote, and other data. In some implementations, the total vote count, the count of approval votes, and the count of disapproval votes are also tallied for each content submission and stored in the voting statistics data store 214.

In some implementations, the content server 216 presents a number of top-ranked content submissions (e.g., top 10 content submissions) in a selected topic category according to a popularity ranking. The popularity ranking aims to identify content submissions that have received or is likely to receive the most positive feedback among all of the content submissions under a topical category. Various methods are described in this specification to generate a popularity ranking for the content submissions.

In this example, the content server 216 includes an approval ranking module 218. The approval ranking module 218 uses the voting statistics stored in the voting statistics data store 214 to compute a popularity score for each content submission received and registered by the content receiver 208. The approval ranking module 218 then ranks the content submissions based on the computed popularity scores. The content server 216 serves the content submissions in an order according to the approval ranking produced by the approval ranking module 218. Typically, only the top-ranked (e.g., the top 10) content submissions are presented to the user by default. Lower-ranked content submissions are optionally presented upon specific user requests (e.g., by user browsing).

In some implementations, the content server 216 also presents one or more featured content submissions to the users and prompts the users to enter votes for the featured content submissions. The content server 216 includes a vote scheduling module 220 that selects the content submissions in the content submission data store 210 to be presented as featured content submissions. In some implementations, the vote scheduling module 220 computes a voting priority score for each content submission received and registered by the content receiver 208. The vote scheduling module 220 then ranks the content submissions based on the computed voting priority scores.

The content server 216 serves the top-ranked content submissions in the voting priority ranking as featured content submissions to users and prompts the viewing users to submit votes with respect to the featured content submissions presented. In some implementations, the selection of featured content submissions from among the top-ranked content submissions in the voting priority ranking is optionally randomized to overcome the effects of edge cases (e.g., content submissions having only a single vote) in the top-ranked content submissions.

To illustrate the use and operation of an online community system, consider the following example. In this example, a user establishes a new topical category for content submissions, such as a "meeting agenda" topic. The user invites other users to submit suggested agenda items for a meeting specified in the "meeting agenda" topic. Each user is also invited to vote on one or more suggested agenda items when the items are presented to the user (e.g., when the user browses through the submitted agenda items, the most popular agenda items, or the featured agenda items). When an agenda item is submitted, it is accompanied with a single approval vote from the user submitting the agenda item.

In some cases, a topic is open for content submissions (e.g., suggested agenda items) and/or voting for a specific period of time (e.g., until one day before the scheduled meeting date). In some cases, content submission and/or voting are open indefinitely (e.g., until a specific number of submissions and/or votes have been collected). Continue with the meeting agenda example, as votes accumulate for each suggested agenda items, users are presented with the most popular suggested agenda items based on the overall opinions expressed by the votes collected for each suggested agenda item. The voting process helps to distill a large number of suggested agenda items to a final list of a few agenda items that are considered the most popular or important for the meeting.

However, in many cases, the ranking process would not work well if the discrepancy between the popularity ranking and the true popularity of the content submissions is too large. The challenges for producing an accurate popularity ranking stem from a few properties that are inherent in the content and vote submission processes.

For example, during the time that a topic is open for content submission and voting, the content submissions and vote submissions are highly concurrent. Content submissions arrive at the content receiver 208 at random times, and votes submitted with respect to the content submissions arrive at the vote receiver 212 at random times as well. Therefore, at any point in time, there is a substantial amount of uncertainty in determining (1) how many new content submissions will be received during a future time interval, (2) how many new votes will be received for each existing and new content submissions during the future time interval, and (3) what percentage of the new votes will be approval or disapproval votes. In addition, there is also a substantial amount of latency between when a content submission is received and when it is ranked and/or presented for voting.

The latency and concurrency inherent in the content and vote submission processes affect the accuracy of the popularity ranking at any given time. In some cases, depending on the ranking methods used for the popularity ranking and vote scheduling, the inaccuracy in the popularity ranking may be exacerbated and may not be self-correctable with additional voting over time.

For example, in conventional content management systems, an absolute vote count (e.g., the number of approval votes—the number of disapproval votes) or a variant of the absolute vote count (e.g., 2*the number of approval votes—the disapproval votes) is computed for each content submission, and the absolute vote count is used as the popularity score for ranking the content submissions.

The absolute vote count would have been a fair indicator of true popularity if (1) each content submission were given an equal opportunity to absorb votes (e.g., if the content submissions had entered the system at the same time and had been presented to an equal number of users) and (2) had also received a sufficiently large number of votes to reflect the average opinion of most users who have not seen the content submission. However, due to the inherent latency and concurrency in the content and vote submission processes, content submissions do not typically enter the system at the same time. Therefore, late arriving content submissions are open for voting for a shorter period of time, and are competing with a greater number of content submissions for votes than the early arriving content submissions. As a result, the late arriving content submissions are often given lower popularity scores and are ranked lower in the popularity ranking than the early arriving content submissions.

In addition, the popularity scores based on absolute vote counts do not self-correct over time. For example, by having a lower popularity ranking to start with, the late arriving content submissions are less frequently presented to users, and therefore are always placed at a disadvantage competing with the early arriving content submission even if the late arriving content submission may actually be more popular if given more exposure to the users.

For another example, in some conventional content management systems, instead of absolute vote counts, an approval ratio (e.g., the ratio between the approval vote count and the total vote count) is computed for each content submission, and the approval ratio is used as the popularity score for ranking the content submissions.

Although using the approval ratios of content submissions as a measure of popularity mitigates the problems caused by the uneven distribution of votes among the early arriving content submissions and the late arriving content submissions, popularity scores based on the approval ratios alone also has some drawbacks.

For example, the approval ratio of a content submission fluctuates greatly when the number of votes accumulated for the content submission is small. When a content submission enters the content management system, the content submission carries a single approval vote cast by the user submitting the content submission. The approval ratio is unity at this point and carries no useful popularity information. Each subsequent vote received for the content submission either does not alter the approval ratio at all or alters the approval ratio greatly until ultimately a large number of votes are accumulated for the content submission. For some late arriving content submissions, the votes accumulated for the content submissions are often scarce at the time that the popularity scores are computed or when the voting is closed. As a result, the ranking of these late arriving content submissions are often arbitrary, and does not reflect the true popularity of the content submissions (e.g., the approval ratio obtained if the content submissions had each accumulated a large number of votes).

In addition, the popularity scoring based on approval ratios alone also do not self-correct over time. For example, if by chance, the first few votes that a content submission receives were mostly disapproval votes, the popularity score based on the approval ratio alone would be decidedly low for the content submission as compared to most other content submissions. As a result, the content submission is unlikely to be presented to users to receive additional votes to correct the low popularity score even if the content submission could have been a truly popular submission had it started (by chance) with a few approval votes instead.

The arbitrariness and bias of popularity ranking illustrated in the conventional content management systems stem from the fact that they do not account for the concurrency, latency, and randomness in the way content and votes are submitted by users in a distributed online community environment. This specification describes technologies that dynamically rank content and schedule content for voting, that address the concurrency, latency, and randomness inherent in the content and vote submission processes. The ranking and vote-scheduling take into account the number of votes currently accumulated for each content submission, such that each content submission has an opportunity to overcome the disadvantage associated with late arrival and/or a few unfavorable votes received at the voting onset and compete fairly with other content submissions. As a result, a more accurate list of popular content submissions can be identified.

In addition, votes are a scarce resource in the content management system. It is difficult to obtain a large number of votes on each content submission submitted to the content management system. Therefore, it is desirable to determine based on a relatively small number of votes (e.g., 10 votes or less) whether a content submission has the potential to become a popular submission if given more exposure (e.g., presented as a featured content submissions) to the users. If a content submission is not likely to become popular, presenting the content submission for additional voting is wasteful because in most cases, people do not care about how unpopular a content submission is. If a content submission has already accumulated a large number of votes, it may be wasteful to present it for additional voting unless it has proven to be rather popular and additional votes would improve the accuracy for its exact ranking within the top-ranked content submissions.

The technologies describe in this specification not only addresses the latency and concurrency of the content and vote submissions processes, but also efficiently allocate the voting opportunities among the content submissions that have the most potential to become the most popular submissions. In addition, more votes are allocated to content submissions that are popular than content submissions that are unpopular, therefore, fidelity of the exact ranking orders of the more popular content submissions is improved at the expense of the ranking accuracy of the less popular content submissions. Since users are typically more interested in knowing the exact ranking orders of a few most popular content submissions than the exact ranking orders of the less popular content submissions, this kind of vote shifting is desirable.

FIGS. 3-6 illustrate a few example processes in which approval ranking and vote scheduling of content submissions are determined based on a statistical confidence interval of a respective approval ratio for each of the content submissions. The statistical confidence interval of an approval ratio takes into account both the current value of the approval ratio and the number of votes accumulated for each content submission.

The lower bound of the statistical confidence interval serves as a pessimistic estimate of the true popularity of the content submission based on the currently available votes. When there are only a small number of votes accumulated for a content submission, the lower bound of the statistical interval is below and departs widely from the current value of the approval ratio for the content submission. As additional votes accumulate for the content submission, the value of the approval ratio is adjusted by the additional votes and the lower bound of the statistical confidence interval converges toward the current value of the approval ratio.

Because the lower bound of the confidence interval (rather than the approval ratio itself) is used as the measure of popularity, it is unlikely for a content submission with a lucky start (e.g., started with a few approval votes) to be deemed among the most popular submissions based on just a few votes. In addition, the lower bound of the confidence interval converges toward the true approval ratio of the content submission as additional votes are accumulated, therefore, early arriving content submissions would not be able to maintain an advantage over late arriving content submissions in the popularity ranking as they would if absolute vote counts were used as the measure of popularity.

The upper bound of the statistical confidence interval serves as an optimistic estimate of the true popularity of the content submission based on the currently available votes. When there are only a small number of votes accumulated for a content submission, the upper bound of the statistical confidence interval is above and departs widely from the current value of the approval ratio for the content submission. As additional votes accumulate for the content submission, the value of the approval ratio is adjusted by the additional votes and the upper bound of the statistical confidence interval converges toward the current value of the approval ratio.

By using the upper bound of the statistical confidence interval as a voting priority score for vote scheduling, content submissions that have shown good promise to become a popular content submission are given more voting opportunities. For example, when a content submission has a high approval ratio with a small number of initial votes, the upper bound of the content submission's approval ratio would be higher compared to other content submissions that have an equal number of votes but a lower approval ratio. Therefore, it is more efficient to allocate votes to the content submission having the higher upper bound (or the higher voting priority score) than the other content submissions having lower upper bounds (or the lower voting priority scores).

In addition, for a content submission that is able to maintain an exceptionally high approval ratio even after a substantial number of votes have accumulated, the upper bound of the statistical confidence interval would also be high for the content submission. Therefore, the voting priority score of the content submission would be high and cause additional votes to be allocated to the content submission. Such vote allocation is nonetheless efficient because it is desirable to improve the fidelity of the ranking order among the few top-ranked content submissions with additional votes.

Figure 3:
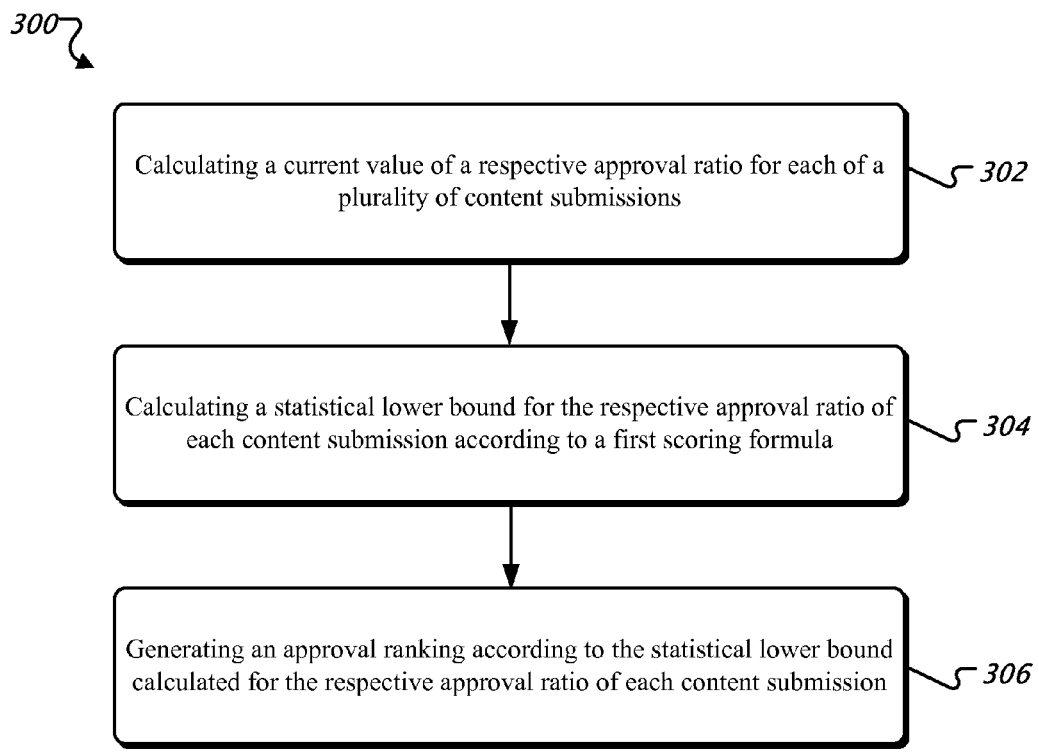
FIG. 3 is a flow diagram of an example process for generating a popularity ranking for content submissions based on a lower bound of a statistical confidence interval.

FIG. 3 illustrate an example process 300 for generating an approval ranking for content submissions based on the lower bound of a statistical confidence interval for each of the content submissions. The process 300 is optionally repeated each time when a new vote is received by the content management server. The repeated process 300 causes the approval ranking of the content submissions to be updated dynamically during the voting period. In some implementations, the process 300 is performed periodically (e.g., every 10 minutes) to account for all of the new votes received during the past time period. In some implementations, the process 300 also applies to content submissions that are newly added to the set of content submissions being scored and ranked for their relative popularity. The process 300 is optionally repeated until the voting period for a topic category is concluded and all votes for all content submission in the topic category are tallied. In some implementations, if the voting continues indefinitely, the process 300 is repeated indefinitely as well, as long as new content submissions and new votes continue to arrive at the content management system.

First, a current value of a respective approval ratio for each of a plurality of content submissions is calculated (302). For each content submission, the respective approval ratio is a proportion of approval votes among all votes currently accumulated for the content submission. As additional votes are accumulated for the content submission, the total vote count increases, the current value of the approval ratio may also vary depending on the current count of approval votes versus the current count of disapproval votes in the total vote count for the content submission. With a newly arrived content submission, the approval ratio is unity (i.e., one approval vote among one total vote).

Then, a statistical lower bound for the respective approval ratio of each content submission is calculated according to a first scaling method (304). The first scaling method scales down the current value of the respective approval ratio by a decreasing amount with an increasing vote count for the content submission. In some implementations, the first scaling method uses a first scoring formula to scale the current value of the approval ratio. The first scoring formula is the so-called "popularity score" formula, and takes into account both the current approval ratio computed based on available votes and the total count of available votes used to calculate the approval ratio.

An example of the first scoring formula is a formula for calculating the lower bound of a Wilson score interval. The Wilson score interval is a good approximation to a binomial proportion confidence interval. The Wilson score interval provides good coverage probabilities for the nominal values of a binomial distribution even for a small number of trials (e.g., a small sample size of 10 or less) and/or at extreme probabilities (e.g., close to 0 or 1). These properties of the Wilson score interval make it a good candidate for describing the vote distribution of a content submission, particularly, where votes are scarce and when the probabilities of interest are toward the extreme (e.g., closer to zero).

An expression of the Wilson score interval is $$\frac{\hat{p} + \frac{1}{2n}z_{1-\alpha/2}^2 \pm z_{1-\alpha/2}\sqrt{\frac{\hat{p}(1-\hat{p})}{n} + \frac{z_{1-\alpha/2}^2}{4n^2}}}{1 + \frac{1}{n}z_{1-\alpha/2}^2} \quad \text{(Equation 1)}$$

where $\hat{p}$ is the proportion of success in a Bernoulli trials process estimated from the statistical sample, n is the sample size, and $Z_{1-\alpha/2}$ is the $1-\alpha/2$ percentile of a standard normal distribution. The value of $Z_{1-\alpha/2}$ can be looked up for a given confidence level. For example, for a confidence level of 95%, $\alpha=0.05$, and $Z_{1-\alpha/2}=1.96$.

Applying the Wilson score interval formula to calculating the confidence interval of an approval ratio for a content submission, $\hat{p}$ is the current value of the approval ratio based on the votes currently accumulated for the content submission, n is the total vote count currently accumulated for the content submission, and $Z_{1-\alpha/2}$ is a tuning parameter that is adjustable such that the confidence interval provides sufficient differentiation between the different small sample sizes (e.g., sample sizes of less than 10 votes per submission) and at the same time convergences quickly toward the true approval ratio with each additional vote.

Therefore, in some implementations, the first scoring formula based on the Wilson scoring interval is:

$$\frac{A + \frac{1}{2n}C_1^2 - C_1\sqrt{\frac{A(1-A)}{n} + \frac{C_1^2}{4n^2}}}{1 + \frac{1}{n}C_1^2} \quad \text{(Equation 2)}$$

where A is the current value of the approval ratio (e.g., the proportion of approval votes among all votes currently accumulated for the content submission), $C_1$ is an adjustable parameter having values greater than zero (e.g., $1.8<C_1<3$), and n is the count of all votes currently accumulated for the content submission.

After the lower bound of the confidence interval, or in other words, the "popularity score" of each submission is calculated and used to generate an approval ranking for the content submissions. The approval ranking for the content submissions can be generated according to the statistical lower bound calculated for the respective approval ratio of each of the content submissions (306). In one example, the popularity score for each content submission is equal to the value of the lower bound of the confidence interval calculated for the content submission, and the content submissions are ranked in the order of decreasing popularity scores. In various implementations, the popularity score is a function of the lower bound of the confidence interval, where the function establishes a positive correlation between the popularity score and the value of the lower bound of the confidence interval.

After the approval ranking is generated, one or more content submissions in the popularity ranking (e.g., the top 10 content submissions in the popularity ranking) can be selected and provided to users as the most popular content submissions among the plurality of content submissions. In some implementations, the top-ranked content submissions are provided and presented when a user submits a request to see the most popular content submissions among the current collection of content submissions.

The top-ranked content submissions identified based on the lower bounds of their respective approval ratios at the time of ranking are not necessarily the top-ranked content submissions identified based on the true approval ratios obtained if all content submissions were submitted at the same time, and had been voted on by a large and equal number of users. However, given the properties of the Wilson score interval, the popularity ranking based on the lower bound of the Wilson score interval is rather accurate even if the number of votes is small and the content submissions have been submitted at different times.

Figure 4:
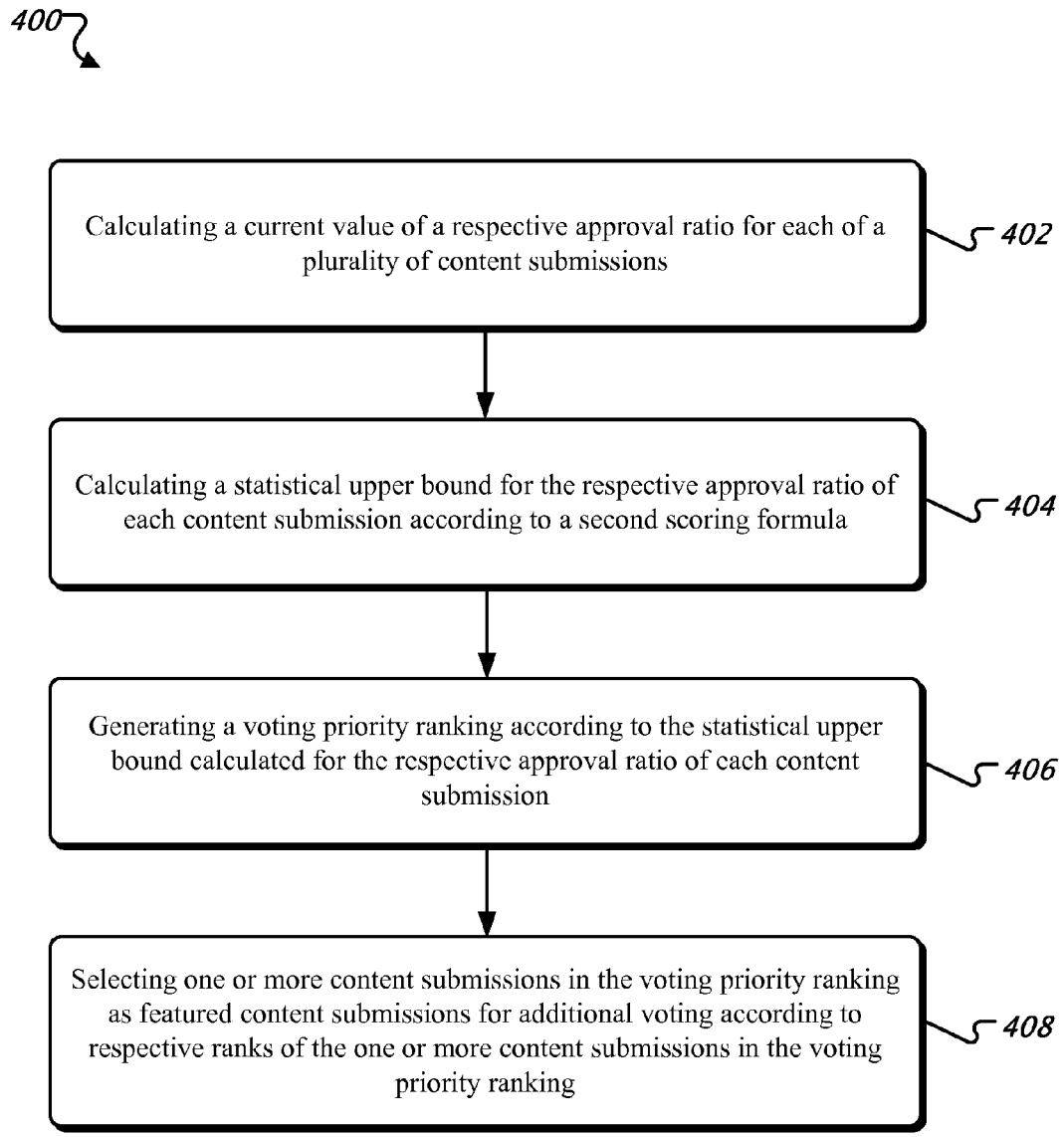
FIG. 4 is a flow diagram of an example process for generating a voting priority ranking for content submissions based on an upper bound of a statistical confidence interval.

FIG. 4 illustrates an example process 400 for generating a voting priority ranking for content submissions according to the upper bound of a statistical confidence interval for each of the content submissions. The process 400 is optionally repeated each time when a new vote is received by the content management server. The repeat of the process 400 allows the voting priority ranking of the content submissions to be updated dynamically. In some implementations, the process 400 is performed periodically (e.g., every 10 minutes) to account for all of the new votes received during the past time period. In some implementations, the process 400 is performed when the process 300 is performed by the content management system.

In some implementations, the top-ranked content submissions in the voting priority ranking are selected and presented to users as featured content submissions. The featured content submissions are presented to the users to encourage them to submit their votes with respect to the featured content submissions. In some implementations, the selection from among the top-ranked content submissions in the voting priority ranking is randomized such that unnatural effects caused by edge cases (e.g., single vote cases) are reduced.

The process 400 starts when a current value of a respective approval ratio for each of the available content submissions is calculated (402). In some implementations, the process 400 shares the approval ratio calculations with the process 300. After the current values of the approval ratios are calculated, the process 400 continues, and a statistical upper bound for the respective approval ratio of each content submission is calculated according to a second scaling method (404), where the second scaling method scales up the current value of the respective approval ratio by a decreasing amount with an increasing vote count for the content submission.

The second scaling method can use a second scoring formula to scale up the current value of the approval ratio. The second scoring formula is the so-called "voting priority score" formula, and it takes into account both the current approval ratio computed based on available votes and the total count of available votes used to calculate the approval ratio. An example of the second scoring formula is a formula for calculating the upper bound of a Wilson score interval for the current value of the approval ratio.

As set forth above, the Wilson score interval is a good approximation to a binomial proportion confidence interval, and provides a good description of the vote distribution where votes are scarce and when the probabilities of interest are toward the extreme (e.g., close to zero). In some implementations, the second scoring formula based on the Wilson scoring interval is:

$$\frac{A + \frac{1}{2n}C_2^2 - C_2\sqrt{\frac{A(1-A)}{n} + \frac{C_2^2}{4n^2}}}{1 + \frac{1}{n}C_2^2} \qquad \text{(Equation 3)}$$

where A is the current value of the approval ratio (e.g., the proportion of approval votes among all votes currently accumulated for the content submission), $C_2$ is an adjustable parameter having values greater than zero (e.g., $1.8 < C_2 < 3$), and n is the count of all votes currently accumulated for the content submission. In some implementations, $C_1$ and $C_2$ are identical constants. In other implementations, $C_1$ and $C_2$ are different constants and are independently tunable.

After the upper bound of the confidence interval, or in other words, the "voting priority score" of each content submission is calculated, a voting priority ranking for the content submissions is generated according to the statistical upper bound calculated for the respective approval ratio of each of the content submissions (406). In one example, the voting priority score for each content submission is equal to the value of the upper bound of the confidence interval for the content submission, and the content submissions are ranked in the order of decreasing voting priority scores. In various implementations, the voting priority score is a function of the upper bound of the confidence interval, where the function establishes a positive correlation between the voting priority score and the value of the upper bound of the confidence interval.

After the voting priority ranking is generated, one or more content submissions in the voting priority ranking (e.g., the top 10 content submissions or content submissions that have voting priority scores above a predetermined threshold value) are selected as featured content submissions for additional voting according to respective ranks of the one or more content submissions in the voting priority ranking (408). In some implementations, the selected content submissions in the voting priority ranking are provided and presented to a user when the user submits a request to see the featured content submissions among the current collection of content submissions. In some implementations, the featured content submissions are presented on the user interface of the online community by default, to encourage viewing and voting for the featured content submissions.

In some implementations, not all top-ranked content submissions in the voting priority ranking are presented to users at the same time. For example, each user can be shown a single featured content submission at a time, and at the online community level, the number of users that are shown the same featured content submission is positively correlated to the voting priority score of the featured content submission during a given time period (e.g., until a new voting priority ranking is generated).

In some implementations, the selection of the featured content submission from the top-ranked content submissions in the voting priority ranking is randomized. In one example, the selection is based on geometrically distributed probabilities. On each selection, a geometrically distributed random number is generated, where the random number is an integer that represents the number of independent trials that can happen with a probability p before a first success is obtained. The random number is then transformed into an index number in the voting priority ranking, and the content submission at that index number in the voting priority ranking is selected as the featured content submission for this selection round. Optionally, one selection round is carried out each time a new request for featured content submission is received by the content management system.

The transformation from the random number to the index number can be a direct copy in terms of magnitude. For example, a random number of value "1" is transformed to an index number of "1" in the voting priority ranking; a random number of value "2" is transformed to an index number of "2" in the voting priority ranking, and so on. In some implementations, if the random number is larger than the number of content submissions that have voting priority scores above the predetermined threshold, the random number is discarded, and a new random number is generated. In some implementations, other methods of transforming the random number into a corresponding index number in the voting priority ranking are possible.

Using the above randomization method, the probability that a content submission in the voting priority ranking (e.g., content submissions having a voting priority score above a predetermined threshold value) is selected as a featured content submission and presented to a user decays with the content submission's ranking order (e.g., index value) in the voting priority ranking. The highest-ranked content submission in the voting priority ranking has the highest probability of being selected as a featured content submission and presented to a user for voting.

Figure 5:
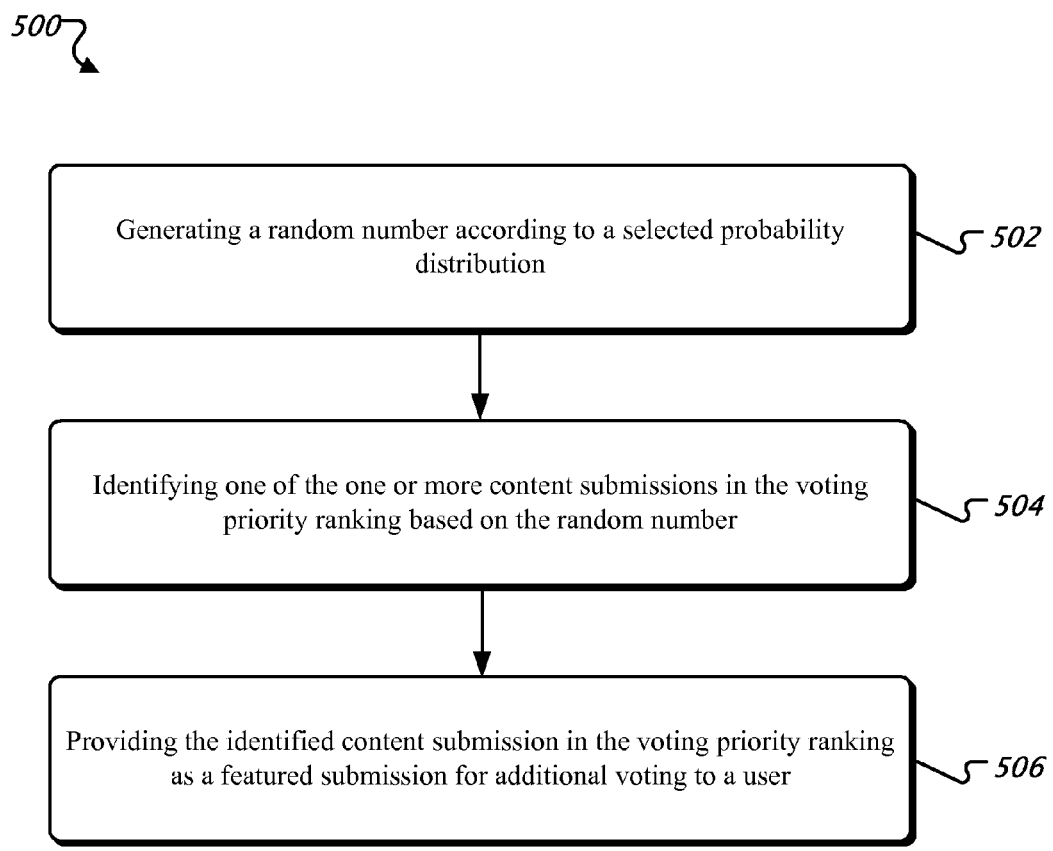
FIG. 5 is a flow diagram of an example process for randomizing the selection of top-ranked content submissions in the voting priority ranking for vote scheduling.

FIG. 5 is a flow diagram of an example process 500 for randomizing the selection of content submissions for vote scheduling based on the vote scheduling priority ranking First, a random number is generated according to a selected probability distribution, wherein each value of the random number occurs with a decreasing probability as the value of the random number increases (502). Then, one of top-ranked content submissions in the voting priority ranking is identified based on the random number, wherein a rank of the identified content submission in the voting priority ranking matches the value of the random number (504). Then, the identified content submission is presented as a featured submission for additional voting to a user (504). The process 500 is optionally repeated each time a request for featured content submissions is received at the content management server.

In some implementations, the selected probability distribution is a geometric probability distribution. The random number generation takes in a parameter P (distinguished from A or p̂ shown in Equations 1-3), which is the probability of success on each trial. According to the geometric probability distribution, the probability that the kth trial is the first success is $$Pr(X=k)=(1-P)^{k-1}P \quad \text{(Equation 4)}$$

The random number generated according to the above probability distribution is k. The parameter P can be tuned to adjust the rate of decay in probability with an increasing value of k.

Based on the process 500, a decreasing selection probability for the top-ranked content submissions in the voting priority ranking is achieved for a decreasing value of the statistical upper bound for the respective approval ratios of the content submissions. In addition, the selection is randomized to remove unnatural effects of edge cases (e.g., approval ratio of 1 with a single vote).

Figure 6:
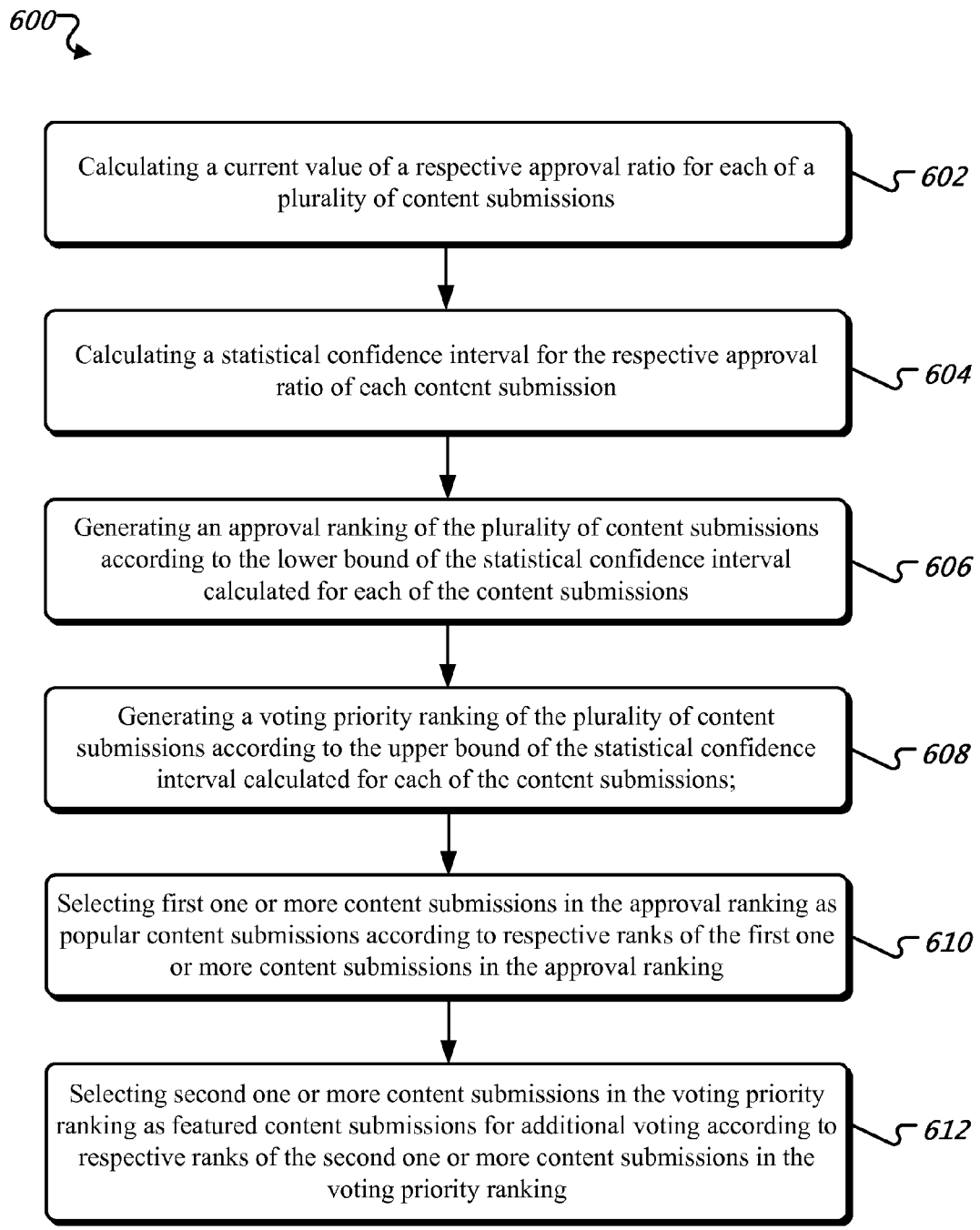
FIG. 6 is a flow diagram of an example process for ranking and vote scheduling for content submissions using a statistical confidence interval.

The processes shown in FIGS. 3-5 are optionally implemented together in a content management system and performed during the content submission and vote submission processes. FIG. 6 is a flow diagram that illustrates the combined process 600 for ranking and vote scheduling for content submissions using a statistical confidence interval.

The process 600 starts when a current value of a respective approval ratio is calculated for each of a plurality of content submissions (602). The respective approval ratio is a proportion of approval votes among all votes currently accumulated for the content submission. A statistical confidence interval is calculated for the respective approval ratio of each content submission (604), wherein an upper bound and a lower bound of the statistical confidence interval each departs from the current value of the respective approval ratio by a decreasing amount with an increasing vote count for the content submission. In other words, the upper bound of the confidence interval is a scaled up version of the current value of the approval ratio, while the lower bound of the confidence interval is a scaled down version of the current value of the approval ratio, and the amount of scaling applied to the approval ratio is a decreasing function of the number of votes accumulated for the content submission.

In some implementations, the scaling function is the Wilson score formula, where the amount of scaling applied to the current value the approval ratio that would result from the Wilson score formula decreases with an increasing total vote count. Other variants of the scaling function are possible.

An example process for designing a scaling function for the approval ratio is illustrated below. In this example, a scaling factor, $s\_f(n)=(1-1/n)=(n-1)/n$, decreases with an increasing vote count n currently accumulated for the content submission. The upper bound of the confidence interval is a scaled up version of the approval ratio A. In a simplified example, the upper bound of the confidence interval is calculated using a scaling formula: $A\_up=A/s\_f(n)=A*n/(n-1)$. The lower bound of the confidence interval is a scaled down version of the approval ratio A. In a simplified example, the lower bound of the confidence interval is calculated using another scaling formula: $A\_down=A*s\_f(n)=A*(n-1)/n$. To improve the performance of the confidence interval, a tuning parameter C can be added to the scoring formulae A_up and A_down, such that the scaling formula for the upper bound is $A\_up=A*n)/(n-C)$, while the scaling formula for the lower bound is $A\_down=A*(n-C)/n$, wherein C is a tunable value between zero and unity. The value of the tunable parameter C influences how quickly the scaling factor $s\_f(n)$ goes from zero to unity. When C=0, the scaling is turned off completely.

Other scaling functions that scales the approval ratio up and down based on the number of votes received for a content submission can be designed and implemented. One or more tunable parameters can be added to the scaling function to adjust the speed that the upper and lower bounds of the confidence interval converge toward the true value of the approval ratio (e.g., the approval ratio value that a content submission would have if it had accumulated a sufficiently large number of votes). Scaling functions that converge quickly (e.g., within less than 10 votes) toward the true value of the approval ratio and at extreme approval ratio values (e.g., close to unity) are best suited for popularity ranking and vote scheduling.

After the upper bound and the lower bound of the statistical confidence interval is calculated, an approval ranking of the plurality of content submissions is generated according to the lower bound calculated for each content submission (606). The content submissions are ordered in the approval ranking according to descending values of the lower bounds of confidence intervals for the content submissions. The content submission having the highest lower bound is ranked highest in the approval ranking.

In addition, a voting priority ranking of the plurality of content submissions is generated according to the upper bound calculated for each content submission (608). The content submissions are ordered in the voting priority ranking according to descending values of the upper bounds of the confidence intervals for the content submissions. The content submission having the highest upper bound is ranked highest in the voting priority ranking.

After the popularity ranking is generated, one or more content submissions (e.g., the top 10 content submissions) in the approval ranking are selected as popular content submissions among the plurality of content submissions according to respective ranks of the one or more content submissions in the approval ranking (610). After the voting priority ranking is generated, one or more content submissions (e.g., top 10 content submissions) in the voting priority ranking are selected as featured content submissions for additional voting according to respective ranks of the one or more content submissions in the voting priority ranking (612). In some implementations, when selecting the featured content submissions, only content submissions that have their respective upper bounds above a predetermined threshold value (e.g., 0.7) are eligible to be selected.

In some implementations, the selection of the featured content submissions for presentation on a client device is randomized according to a selection probability assigned to each of the one or more content submissions (e.g., the top 10 content submissions) in the voting priority ranking. The selection probability for each of the one or more content submissions can be based on a selected probability distribution which produces a decreasing selection probability for an decreasing value of the statistical upper bound for the respective approval ratios of the one or more content submissions. One example of the selected probability distribution is a geometric distribution. Other probability distributions are possible.

In some implementations, extensions of the approval ranking and vote scheduling methods described in this specification are possible. For example, although the term "popularity" is used to denote the level of overall approval or positive attention that a content submission receives, the system can be designed to identify the most unpopular or notorious content submissions given the amount of negative votes the content submissions receives. In such implementations, instead of the approval ratios, disapproval ratios (e.g., the ratio between the count of disapproval votes and the total vote count) are used in the calculation of the confidence intervals.

In some implementations, different weights are assigned to votes submitted at different times during the voting period. For example, votes submitted later in the voting period can be associated with a greater weight as compared to the weight associated with an earlier vote submitted with respect to a content submission. In some implementations, each newly received vote is multiplied by a multiplier when the newly received vote is added to the total vote count. As a result, a single vote received later in the voting period contributes more to the total vote count that a single vote received earlier in the voting period. Similarly, a single approval (or disapproval) vote received later in the voting period contributes more to the approval (or disapproval) vote count that a single approval (or disapproval) vote received earlier in the voting period. In one example, the multiplier, M is equal to $(1+q)^m$, where q is the inflation factor, and m is the number days into the voting period when the new vote is received.

In some implementations, the ranking and/or vote scheduling process takes into account the voter's status in the online community. For example, votes submitted by a seasoned user can be associated with a greater weight as compared to the weight associated with votes submitted by a novice user. A multiplier is calculated for each vote based on the status of user submitting the vote, and each vote is multiplied by its multiplier before the vote is tallied in the total vote count and the approval (or disapproval) vote count. The status of a user is optionally based on the number of votes (or topics, or content submissions) submitted by the user. For example, a multiplier M for a vote submitted by a user is optionally calculated by the formula $M(v)=v^b$, where v is the number of votes previously submitted by the user, and b is a tunable parameter. For example, if b=0.3, and v=50, the user's next vote would be counted as 3.2 votes in the total vote count, rather than just one vote. By setting the tunable parameter b to zero, this mechanism can be turned off.

Figure 7:
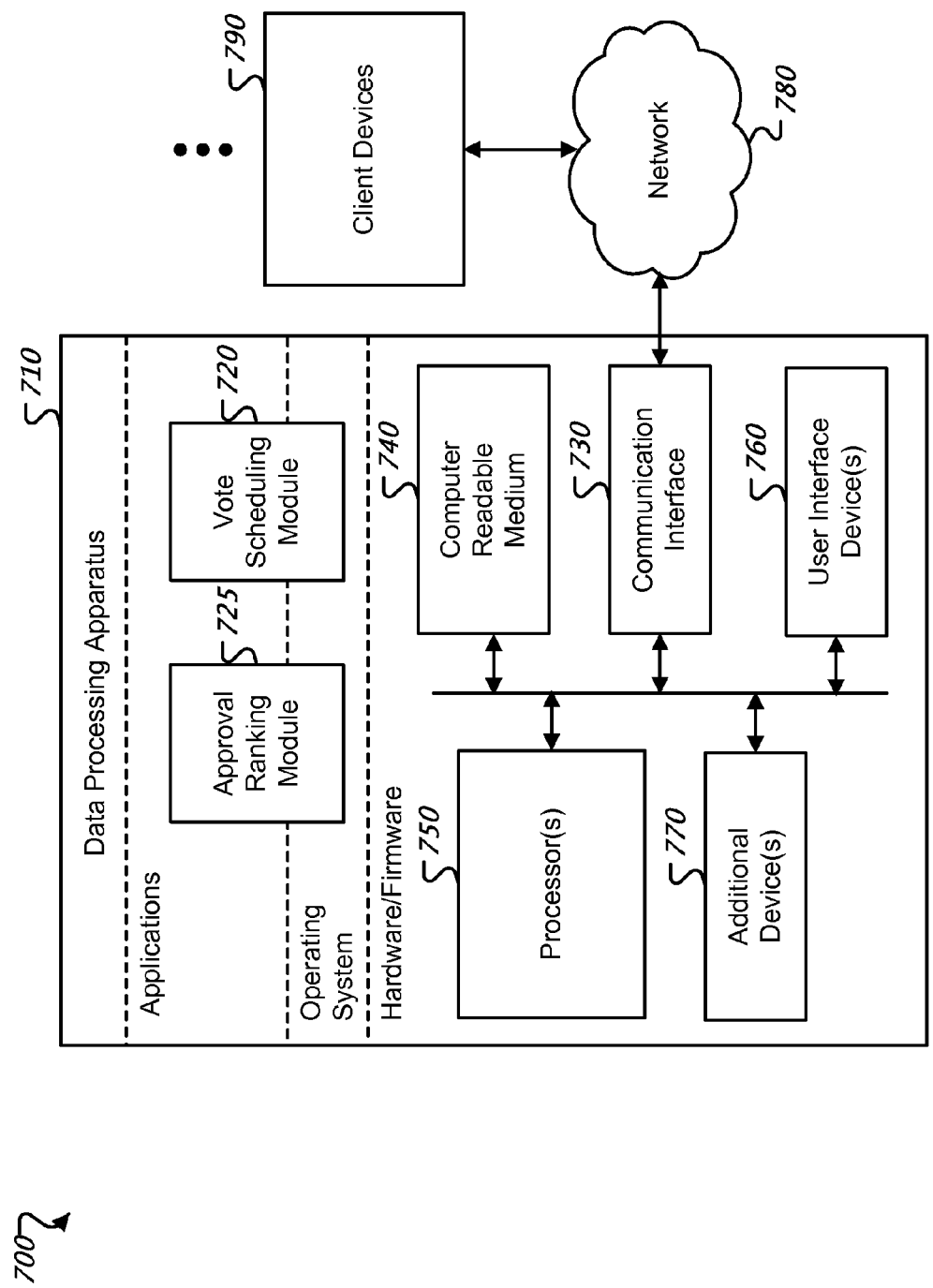
FIG. 7 is a block diagram illustrating a generic computer system.

FIG. 7 is a schematic diagram of an example online community environment 700. The environment 700 includes a server system 710 communicating with client devices 790 through a network 780, e.g., the Internet. The user device 790 is one or more data processing apparatus. Users interact with the client devices 790 through application software such as web browsers or other applications.

The server 710 is a data processing apparatus and has hardware or firmware devices including one or more processors 750, one or more additional devices 770, a computer readable medium 740, and one or more user interface devices 760. User interface devices 760 can include, for example, a display, a camera, a speaker, a microphone, a tactile feedback device, a keyboard, and a mouse. The server 710 uses its communication interface 730 to communicate with client devices 790 through the network 780. For example, the server 710 can receive new content submissions and vote submissions from the client devices 790 and to receive requests for existing content submissions and vote statistics, for instance, through its communication interface 730, and can provide user interfaces (e.g., user interface 100 in FIG. 1) to client devices 790 through its communication interface 730.

In various implementations, the server 710 includes various modules, e.g. executable software programs. In various implementations, these modules include an approval ranking module 725 and a vote scheduling module 720. The approval ranking module 725 maintains and updates the approval ranking of existing content submissions and optionally handles requests for the most popular content submissions received from the client devices 790. The vote scheduling module 720 maintains the voting priority ranking of existing content submissions and selects content submissions to present to users for additional voting.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   determining a respective approval metric for each of a plurality of content submissions, the respective approval metric being at least partially based on a number of favorability indications associated with the content submission, wherein each favorability indication indicates either positive or negative favorability;
   determining a statistical upper bound for the respective approval metric of each content submission according to a first scaling method that scales up the current value of the respective approval metric by a decreasing amount with an increasing number of favorability indications that are associated with the content submission;
   generating a priority ranking for the plurality of content submissions according to the statistical upper bound calculated for the respective approval metric of each of the content submissions; and
   selecting one or more content submissions in the priority ranking as featured submissions to elicit votes from users, the selecting occurring according to respective ranks of the one or more content submissions in the priority ranking.

2. The method of claim 1, wherein the first scaling method scales the current value of the respective approval metric to an upper bound of a Wilson score interval calculated for the current value of the respective approval ratio.

3. The method of claim 1, wherein selecting one or more content submissions to elicit votes from users further comprises:
   generating a random number according to a selected probability distribution, wherein each value of the random number occurs with a decreasing probability as the value of the random number increases;
   identifying one of the one or more content submissions in the priority ranking based on the random number, wherein the respective rank of the identified content submission in the voting priority ranking matches the value of the random number; and
   providing the identified content submission in the priority ranking as a featured submission available for voting to a user.

4. A computer-implemented method performed by a data processing apparatus, comprising:
   determining a current value of a respective approval metric for each of a plurality of content submissions;
   determining a statistical confidence interval for the respective approval metric ratio of each content submission, wherein an upper bound and a lower bound of the statistical confidence interval each departs from the current value of the respective approval metric by a decreasing amount with an increasing sample size of favorability indications associated with each content submission, wherein each favorability indication indicates either positive or negative favorability;
   generating a priority ranking of the plurality of content submissions according to the upper bound of the statistical confidence interval calculated for each of the content submissions; and
   selecting first one or more content submissions in the priority ranking as featured submissions for presentation to one or more users to obtain additional favorability indications according to respective ranks of the first one or more content submissions in the priority ranking.

5. The method of claim 4, wherein the selecting the first one or more content submissions in the priority ranking for presentation to elicit additional favorability indications further comprises:
   randomizing the selection of the first one or more content submissions in the voting priority ranking according to a selection probability assigned to each of the first one or more content submissions in the priority ranking.

6. A non-transitory computer-readable medium having instructions stored thereon, the instructions, when executed by one or more processors, cause the processors to perform operations comprising:
   determining a respective approval metric for each of a plurality of content submissions, the respective approval metric being at least partially based on a number of favorability indications associated with the content submission, wherein each favorability indication indicates either positive or negative favorability;
   calculating a statistical upper bound for the respective approval metric of each content submission according to a first scaling method, wherein the first scaling method scales up the current value of the respective approval metric by a decreasing amount with an increasing number of favorability indications associated with the content submission;

generating a priority ranking for the plurality of content submissions according to the statistical upper bound calculated for the respective approval metric of each of the content submissions; and selecting one or more content submissions in the priority ranking as featured content submissions for eliciting votes from users, the selecting being according to respective ranks of the one or more content submissions in the priority ranking.

7. The computer-readable medium of claim 6, wherein the first scaling method scales the current value of the respective approval metric to an upper bound of a Wilson score interval calculated for the current value of the respective approval ratio.

8. The computer-readable medium of claim 6, wherein selecting one or more content submissions for eliciting votes from users further comprises:

generating a random number according to a selected probability distribution, wherein each value of the random number occurs with a decreasing probability as the value of the random number increases;

identifying one of the one or more content submissions in the priority ranking based on the random number, wherein the respective rank of the identified content submission in the priority ranking matches the value of the random number; and providing the identified content submission in the priority ranking as a featured submission available for voting to a user.

9. A non-transitory computer-readable medium having instructions stored thereon, the instructions, when executed by one or more processors, cause the processors to perform operations comprising:

determining a current value of a respective approval metric for each of a plurality of content submissions;

determining a statistical confidence interval for the respective approval metric of each content submission, wherein an upper bound and a lower bound of the statistical confidence interval each departs from the current value of the respective approval metric by a decreasing amount with an increasing sample size of favorability indications associated with each content submission, wherein each favorability indication indicates either positive or negative favorability;

generating a priority ranking of the plurality of content submissions according to the upper bound of the statistical confidence interval calculated for each of the content submissions; and selecting first one or more content submissions in the priority ranking as featured submissions for presentation in order to elicit additional favorability indications according to respective ranks of the first one or more content submissions in the priority ranking.

10. The computer-readable medium of claim 9, wherein the selecting the first one or more content submissions in the priority ranking for presentation in order to elicit additional favorability indications further comprises:

randomizing the selection of the first one or more content submissions in the priority ranking according to a selection probability assigned to each of the first one or more content submissions in the priority ranking.

11. A system, comprising:
one or more processors; and
memory having instructions stored thereon, the instructions, when executed by the one or more processors cause the processors to perform operations comprising:

determining a respective approval metric for each of a plurality of content submissions, the respective approval metric being at least partially based on a number of favorability indications associated with the content submission, wherein each favorability indication indicates either positive or negative favorability;

determining a statistical upper bound for the respective approval metric of each content submission according to a first scaling method, wherein the first scaling method scales up the current value of the respective approval metric by a decreasing amount with an increasing number of favorability indications associated with the content submission;

generating a priority ranking for the plurality of content submissions according to the statistical upper bound calculated for the respective approval metric of each of the content submissions; and selecting one or more content submissions in the priority ranking as featured content submissions for eliciting votes form one or more users, the selecting being according to respective ranks of the one or more content submissions in the priority ranking.

12. The system of claim 11, wherein the first scaling method scales the current value of the respective approval metric to an upper bound of a Wilson score interval calculated for the current value of the respective approval ratio.

13. The system of claim 11, wherein selecting one or more content submissions for eliciting votes from one or more users further comprises:

generating a random number according to a selected probability distribution, wherein each value of the random number occurs with a decreasing probability as the value of the random number increases;

identifying one of the one or more content submissions in the priority ranking based on the random number, wherein the respective rank of the identified content submission in the priority ranking matches the value of the random number; and providing the identified content submission in the priority ranking as a featured submission available for voting to a user.

14. A system, comprising:
one or more processors; and
memory having instructions stored thereon, the instructions, when executed by one or more processors, cause the processors to perform operations comprising:

determining a current value of a respective approval metric for each of a plurality of content submissions;

determining a statistical confidence interval for the respective approval metric of each content submission, wherein an upper bound and a lower bound of the statistical confidence interval each departs from the current value of the respective approval metric by a decreasing amount with an increasing sample size of favorability indications associated with each content submission, wherein each favorability indication indicates either positive or negative favorability;

generating a priority ranking of the plurality of content submissions according to the upper bound of the statistical confidence interval calculated for each of the content submissions; and selecting first one or more content submissions in the priority ranking as featured submissions for presentation in order to elicit additional favorability indications according to respective ranks of the first one or more content submissions in the priority ranking.

15. The method of claim 1, further comprising:
- determining a statistical lower bound for the respective approval metric of each content submission according to a second scaling method that scales down the current value of the respective approval ratio by a decreasing amount with an increasing number of favorability indications associated with the content submission; and
- generating an approval ranking for the plurality of content submissions using the statistical lower bound calculated for the respective approval metric of each of the content submissions.

16. The method of claim 4, further comprising:
- generating an approval ranking of the plurality of content submissions according to the lower bound of the statistical confidence interval determined for each of the content submissions; and
- selecting second one or more content submissions in the approval ranking as popular content submissions among the plurality of content submissions according to respective ranks of the second one or more content submissions in the approval ranking.

17. The computer-readable medium of claim 6, wherein the operations further comprise:
- determining a statistical lower bound for the respective approval metric of each content submission according to a second scaling method that scales down the current value of the respective approval ratio by a decreasing amount with an increasing number of favorability indications associated with the content submission; and
- generating an approval ranking for the plurality of content submissions according to the statistical lower bound calculated for the respective approval metric of each of the content submissions.

18. The computer-readable medium of claim 9, wherein the operations further comprise:
- generating an approval ranking of the plurality of content submissions according to the lower bound of the statistical confidence interval determined for each of the content submissions; and
- selecting second one or more content submissions in the approval ranking as popular content submissions among the plurality of content submissions according to respective ranks of the second one or more content submissions in the approval ranking.

19. The system of claim 11, wherein the operations further comprise:
- determining a statistical lower bound for the respective approval metric of each content submission according to a second scaling method that scales down the current value of the respective approval ratio by a decreasing amount with an increasing number of favorability indications associated with the content submission; and
- generating an approval ranking for the plurality of content submissions according to the statistical lower bound calculated for the respective approval metric of each of the content submissions.

20. The system of claim 14, wherein the operations further comprise:
- generating an approval ranking of the plurality of content submissions according to the lower bound of the statistical confidence interval determined for each of the content submissions; and
- selecting second one or more content submissions in the approval ranking as popular content submissions among the plurality of content submissions according to respective ranks of the second one or more content submissions in the approval ranking.

* * * * *

UNITED STATES PATENT AND TRADEMARK OFFICE
CERTIFICATE OF CORRECTION

PATENT NO.        : 8,744,989 B1                                    Page 1 of 1
APPLICATION NO.   : 13/932518
DATED             : June 3, 2014
INVENTOR(S)       : Westbrook It is certified that error appears in the above-identified patent and that said Letters Patent is hereby corrected as shown below:

On Title Page 2, Item [56] column 2, line 4, after "average" delete "average".

In the Claims:

Column 22, line 16, in Claim 3, before "priority" delete "voting".

Column 22, line 26, in Claim 4, before "of" delete "ratio".

Column 22, line 48, in Claim 5, before "priority" delete "voting".

Column 24, line 21, in Claim 11, delete "form" and insert -- from --, therefor.

Signed and Sealed this
Twelfth Day of August, 2014

Michelle K. Lee
*Deputy Director of the United States Patent and Trademark Office*